United States Patent
Nakagawa et al.

(10) Patent No.: US 7,627,906 B2
(45) Date of Patent: Dec. 1, 2009

(54) SERVICE DISCOVERY SYSTEM, CLIENT TERMINAL, SERVICE PROVIDING DEVICE, AND SERVICE DISCOVERY METHOD

(75) Inventors: Tomohiro Nakagawa, Yokosuka (JP); Motoharu Miyake, Yokosuka (JP); Hiroshi Inamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 804 days.

(21) Appl. No.: 11/211,943

(22) Filed: Aug. 26, 2005

(65) Prior Publication Data

US 2006/0047968 A1 Mar. 2, 2006

(30) Foreign Application Priority Data

Aug. 27, 2004 (JP) ............................. P2004-248542

(51) Int. Cl.
*G06F 7/04* (2006.01)
*G06F 17/30* (2006.01)
*H04N 7/16* (2006.01)

(52) U.S. Cl. .............................. 726/29; 713/181; 726/22

(58) Field of Classification Search ................ 713/169, 713/171, 181, 189; 726/22, 29, 23, 24, 25
See application file for complete search history.

(56) References Cited

U.S. PATENT DOCUMENTS

| | | | | | |
|---|---|---|---|---|---|
| 4,961,579 | A | * | 10/1990 | Thompson et al. | 273/153 R |
| 5,178,545 | A | * | 1/1993 | Thompson | 434/335 |
| 6,565,437 | B2 | * | 5/2003 | Orui | 463/29 |
| 6,587,853 | B1 | * | 7/2003 | LaRue | 707/9 |
| 6,643,650 | B1 | * | 11/2003 | Slaughter et al. | 707/10 |
| 6,789,077 | B1 | * | 9/2004 | Slaughter et al. | 707/10 |
| 6,862,594 | B1 | * | 3/2005 | Saulpaugh et al. | 707/10 |
| 6,868,447 | B1 | * | 3/2005 | Slaughter et al. | 709/225 |
| 6,918,084 | B1 | * | 7/2005 | Slaughter et al. | 715/205 |
| 6,970,869 | B1 | * | 11/2005 | Slaughter et al. | 707/10 |
| 6,973,493 | B1 | * | 12/2005 | Slaughter et al. | 709/225 |
| 7,080,078 | B1 | * | 7/2006 | Slaughter et al. | 707/10 |
| 7,143,163 | B1 | * | 11/2006 | Bleichenbacher et al. | 709/225 |
| 7,143,440 | B2 | * | 11/2006 | Ginzberg | 726/18 |
| 7,197,639 | B1 | * | 3/2007 | Juels et al. | 713/168 |
| 7,395,333 | B1 | * | 7/2008 | Saulpaugh et al. | 709/225 |
| 7,398,533 | B1 | * | 7/2008 | Slaughter et al. | 719/328 |

(Continued)

FOREIGN PATENT DOCUMENTS

JP 2004-88428 3/2004

OTHER PUBLICATIONS

XiaoFeng Wang, et al., "Defending Against Denial-of-Service Attacks with Puzzle Auctions", Proceedings of the IEEE Symposium on Security and Privacy, XP-010639714, May 11, 2003, 15 pages.

*Primary Examiner*—David Garcia Cervetti
(74) *Attorney, Agent, or Firm*—Oblon, Spivak, McClelland, Maier & Neustadt, L.L.P.

(57) ABSTRACT

A service discovery system including a client terminal and a service providing device which provides data or a function to the client terminal, including: a service request unit which generates a message requesting a service of the service providing device; a communication unit which sends the message generated by the service request unit to the service providing device and which receives from the service providing device a problem imposing a load on the client terminal; and a solution unit which solves the problem.

13 Claims, 4 Drawing Sheets

U.S. PATENT DOCUMENTS

| | | | |
|---|---|---|---|
| 7,412,518 B1 * | 8/2008 | Duigou et al. | 709/227 |
| 2003/0172159 A1 * | 9/2003 | Schuba et al. | 709/225 |
| 2004/0236696 A1 * | 11/2004 | Aoki et al. | 705/50 |
| 2005/0149470 A1 * | 7/2005 | Fujie | 707/1 |
| 2007/0016668 A1 * | 1/2007 | Rodriguez | 709/224 |
| 2007/0118754 A1 * | 5/2007 | Togashi et al. | 713/178 |
| 2008/0097753 A1 * | 4/2008 | Oura | 704/214 |
| 2008/0222288 A1 * | 9/2008 | Rodriguez | 709/224 |
| 2008/0313320 A1 * | 12/2008 | Cheng et al. | 709/223 |

* cited by examiner

SERVICE DISCOVERY SYSTEM, CLIENT TERMINAL, SERVICE PROVIDING DEVICE, AND SERVICE DISCOVERY METHOD

CROSS REFERENCE TO RELATED APPLICATIONS

This application is based upon and claims the benefit of priority from prior Japanese Patent Application P2004-248542 filed on Aug. 27, 2004; the entire contents of which are incorporated by reference herein.

BACKGROUND OF THE INVENTION

1. Field of the Invention

The present invention relates to a client terminal, another client terminal providing the client terminal with data or a function, a service providing device, and a service discovery method.

2. Description of the Related Art

A large number of investigations have been carried out on mechanisms, as service discovery protocols, by which a client terminal discovers another service. For example, Jini, UPnP (Universal Plug and Play), SLP (Service Location Protocol), and the like are proposed as protocols defining procedures to discover a service. According to a service discovery protocol, a client utilizing services designates a service to request and broadcasts it in the surrounding environment through its service request function. A service that has received the request, through its service reply function, generates a service reply message and sends it to the client in reply when a service that the service itself provides matches the service described in the service request from the client. As stated above, there has been disclosed a technology for efficiently discovering a participant to communicate with (for example, see Japanese Patent Laid-open Publication No. 2004-88428, and United States Publication No. 2003/0172159).

Moreover, since a service has no knowledge of a client to connect to before a connection is made, the service is required to send service replies back to an indefinite number of clients that are requesting a connection. Further, to prove the identity of the service itself, it is important for the service to add a digital signature to the service reply. Although this digital signature function is not always incorporated in the existing service discovery protocols, SLP provides this function as an option. The use of the function of digital-signing a service reply can prevent an attack of a malicious service sending a counterfeit service reply and hampering a client from connecting to a legitimate service.

However, according to the above conventional technology, the service reply function of the service needs to reply to service requests from an indefinite number of nonspecified clients. Therefore, if a malicious client sent an enormous number of service requests, the service needs to add digital signatures to service replies and send them back to those service requests. Since the digital signature requires the computational processing that would be a heavy load to a service with a limited computing capability such as a digital camera, there arises a problem that the service which is computing an enormous number of digital signatures will be depleted of the CPU resource and unable to process a new service request.

In view of the above problem, an object of the present invention is to provide a client terminal, a service providing device and a service discovery method which enable a legitimate client to discover a service in as short a time as normal and to connect thereto even when a malicious client sent an enormous number of service requests.

SUMMARY OF THE INVENTION

A first aspect of the present invention is to provide a service discovery system including a client terminal and a service providing device which provides data or a function to the client terminal, including: (A) a service request unit which generates a message requesting a service of the service providing device; (B) a problem management unit which generates a problem imposing a load on the client terminal and which, when a solution to the problem is received from the client terminal, verifies the solution; (C) a communication unit which sends the message generated by the service request unit to the service providing device and which receives from the service providing device a problem imposing a load on the client terminal; (D) a solution unit which solves the problem; (E) a problem management unit which generates a problem imposing a load on the client terminal and which, when a solution to the problem is received from the client terminal, verifies the solution; (F) a service reply unit which, when the solution to the problem is received, generates a message replying to the service requesting message sent from the client terminal; (G) a signature unit which adds a digital signature to the message generated by the service reply unit; (H) a time management unit which measures a length of solution time taken by the client terminal to solve the problem; and (I) a risk avoidance unit which calculates a risk of the service requesting message, based on a statistic result given by the statistic processing unit.

A second aspect of the present invention is to provide a client terminal which is provided with data or a function from a service providing device, including; (A) a service request unit which generates a message requesting a service of the service providing device; (B) a communication unit which sends the message generated by the service request unit to the service providing device and which receives from the service providing device a problem imposing a load on the client terminal; (C) a solution unit which solves the problem; (D) a time management unit which records a time of reception of the problem from the service providing device and which, when a solution to the problem is sent out, attaches thereto the time of reception of the problem; and (E) a request retardation unit which, when a length of time from a time of reception of the problem until a solution to the problem is obtained does not reach a given value, waits to send the solution to the service providing device.

A third aspect of the present invention is to provide a service providing device which provides data or a function to a client terminal, including: (A) a problem management unit which generates a problem imposing a load on the client terminal and which, when a solution to the problem is received from the client terminal, verifies the solution; (B) a communication unit which, when a message requesting a service is received from the client terminal, sends the problem to the client terminal and which receives the solution to the problem from the client terminal; (C) a service reply unit which, when the solution to the problem is received, generates a message replying to the service requesting message sent from the client terminal; (D) a signature unit which adds a digital signature to the message generated by the service reply unit; (E) a time management unit which measures a length of solution time taken by the client terminal to solve the problem; and (F) a risk avoidance unit which calculates a risk of the service requesting message, based on a statistic result given by the statistic processing unit.

A forth aspect of the present invention is to provide, in a system including a client terminal and a service providing device which provides data or a function to the client terminal, a service discovery method for discovering the service providing device, including: (A) by the client terminal, generating a message requesting a service of the service providing device; (B) by the service providing device, generating a problem imposing a load on the client terminal; (C) by the service providing device, sending the problem to the client terminal when the service requesting message is received from the client terminal; (D) by the client terminal, solving the problem; (E) by the service providing device, verifying a solution to the problem when the solution is received from the client terminal; (F) by the service providing device, upon the verification of the solution to the problem, generating a message replying to the service requesting message sent from the client terminal; (G) by the service providing device, adding a digital signature to the replying message; and (H) by the client terminal, waiting to send the solution to the service providing device when a length of time from a time of reception of the problem until the solution to the problem is obtained does not reach a given value.

A fifth aspect of the present invention is to provide in a system including a client terminal and a service providing device which provides data or a function to the client terminal, a service discovery method for discovering the service providing device, including: (A) by the client terminal, generating a message requesting a service of the service providing device; (B) by the service providing device, generating a problem imposing a load on the client terminal; (C) by the service providing device, sending the problem to the client terminal when the service requesting message is received from the client terminal; (D) by the client terminal, solving the problem; (E) by the service providing device, verifying a solution to the problem when the solution is received from the client terminal; (F) by the service providing device, upon the verification of the solution to the problem, generating a message replying to the service requesting message sent from the client terminal; (G) by the service providing device, adding a digital signature to the replying message; and (H) by the service providing device, measuring a length of solution time taken by the client terminal to solve the problem; performing statistic processing on each message requesting the service, based on the solution time measured; determining a liability, based on a length of time for which the client terminal used the service providing device; calculating a risk of the service requesting message, based on a result of the statistic processing and the liability; and calculating a priority, based on a difficulty of the problem and the risk, wherein in the step of adding the digital signature, digital signatures are added in order according to the priority.

DETAILED DESCRIPTION OF THE INVENTION

Figure 1:
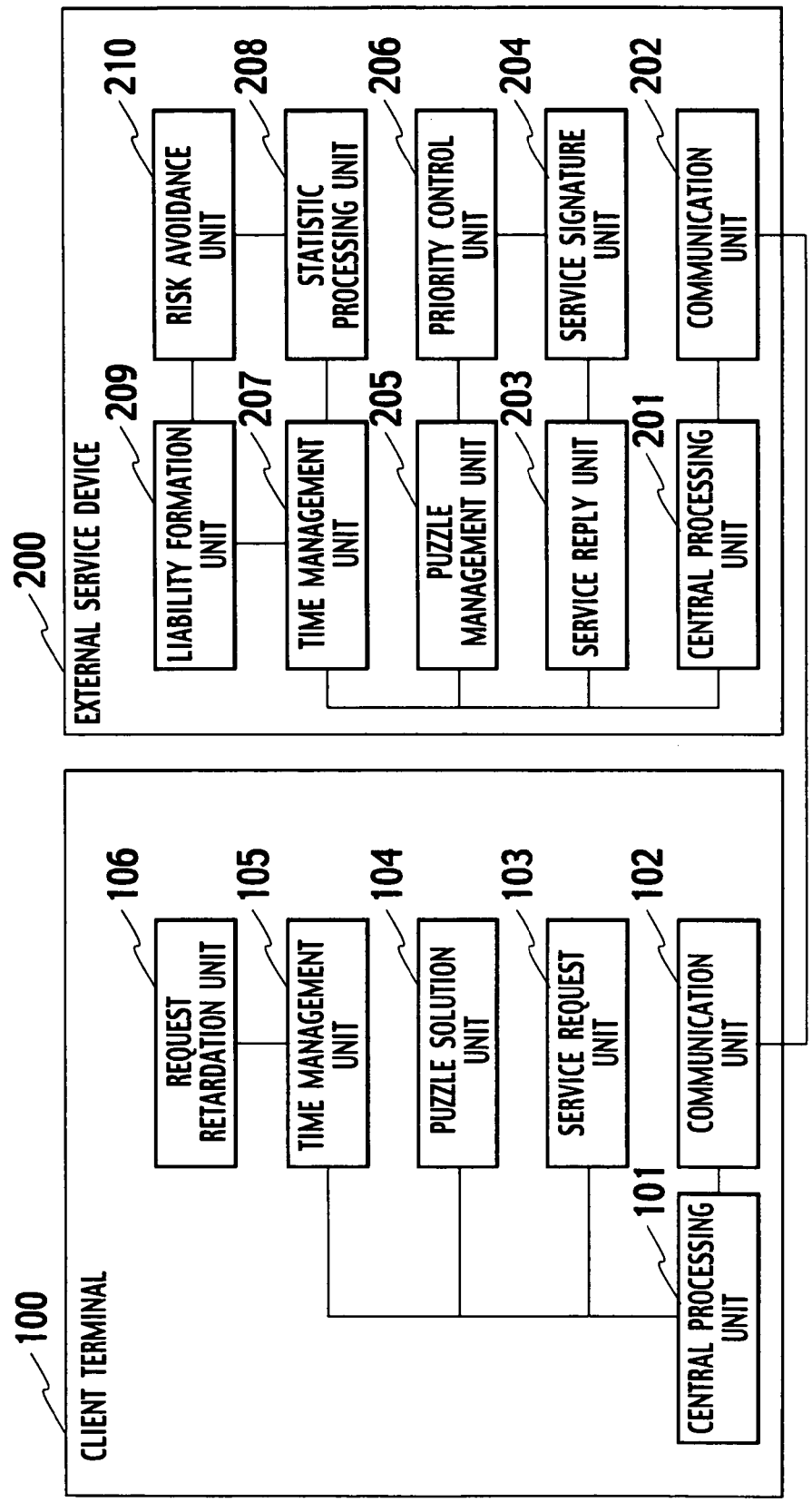
FIG. 1 is a schematic block diagram of a client terminal and an external service device according to an embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Service Discovery System)

A service discovery system according to an embodiment of the present invention includes a client terminal 100 and an external service device 200 (service providing device) as shown in FIG. 1.

In this embodiment, the client terminal 100 connects to the external service device 200 for the purpose of extension of an input/output function, communication with/status-checking of/control of a remote device, and so on. The external service devices 200 include: equipment with an input/output function superior to that of the client terminal, such as digital cameras, video cameras, television sets, and speakers; white goods with a networking function, such as refrigerators, washing machines, microwave ovens, and air conditioners; various sensors such as thermometers, hygrometers, infrared sensors, clinical thermometers, sphygmomanometers, and weight scales; other client terminals such as personal computers (PCs), mobile telephones, and personal digital assistants (PDAs); and hardware or software providing some function or data to the client terminal, such as any kinds of software on a network.

The client terminal 100 implements various kinds of applications that the client terminal 100 cannot implement on its own, by connecting to these external service devices 200. For example, an application like the following can be implemented: an image taken by a high-performance digital camera is transferred to the client terminal 100 to be stored therein, and the image is transferred to an arbitrary television with a large screen to be displayed thereon. Moreover, another application is conceivable in which daily information on a temperature or weight is acquired from a sensor and accumulated in a mobile telephone, and a history of the information for one month is displayed on a television to be checked. To implement these applications, a mechanism for the client terminal 100 to discover another service is required.

Referring to FIG. 1, the client terminal 100 includes a central processing unit 101, a communication unit 102, a service request unit 103, a puzzle solution unit 104, a time management unit 105, and a request retardation unit 106.

The central processing unit 101 controls the flows of information between the components of the client terminal 100.

The communication unit 102 performs communication with a communication unit 202 of the external service device 200. For example, the communication unit 102 sends a message generated by the service request unit 103 to the external service device 200 and receives a puzzle from the external service device 200.

The service request unit 103 generates a message requesting a service (service request) and sends it to the external service device 200 via the communication unit 102. Moreover, the service request unit 103 receives a message replying to the client terminal 100 (service reply) from the external service device 200 via the communication unit 102 and verifies a signature of the service.

The puzzle solution unit 104 solves a problem (puzzle) sent from the external service device 200.

Herein, a "problem" indicates computational processing that imposes some processing load on a client terminal. For example, problems include a computational puzzle utilizing a hash function shared by a client and a service, and the like.

The time management unit 105 records information about a time of reception of a puzzle from the external service device 200, or a timecard. Moreover, when a solution to the problem or a message is sent to the external service device 200, the time management unit 105 reads the information about the time of reception of the problem or the timecard and attaches it to the message.

The request retardation unit 106 does not immediately send a solution to a puzzle to the external service device 200 but waits for a certain period of time, when the length of time from the time of reception of the puzzle until the solution to the puzzle is obtained does not reach a given value, that is, when it took a short time for the puzzle solution unit 104 to solve the puzzle.

Referring again to FIG. 1, the external service device 200 includes a central processing unit 201, the communication unit 202, a service reply unit 203, a service signature unit 204, a puzzle management unit 205, a priority control unit 206, a time management unit 207, a statistic processing unit 208, a liability formation unit 209, and a risk avoidance unit 210.

The central processing unit 201 controls the flows of information between the components of the external service device 200.

The communication unit 202 performs communication with the communication unit 102 of the client terminal 100. For example, when a message requesting a service is received from the client terminal 100, the communication unit 202 sends a puzzle to the client terminal 100 and receives a solution to the puzzle from the client terminal 100.

The service reply unit 203 receives a message requesting a service (service request) from the client terminal 100. Moreover, when a solution to a puzzle is received from the client terminal 100, the service reply unit 203 sends back a message replying to the client terminal 100 (service reply) after the risk avoidance unit 210 and the service signature unit 204 have done their respective processing concerning the message.

The service signature unit 204 adds a digital signature to a message replying to the client terminal 100 (service reply) when receiving a signature request from the service reply unit 203. Additionally, the service signature unit 204 adds digital signatures in order according to priority, which is notified by the priority control unit 206.

The puzzle management unit 205 (problem management unit) generates a puzzle that imposes a load on the client terminal 100, in response to a request from the service reply unit 203. Moreover, when a solution to the puzzle is received, the puzzle management unit 205 verifies the solution to the puzzle.

The priority control unit 206 calculates the priority for signing a service reply, based on the difficulty of a puzzle and the risk (information about risk) calculated by the risk avoidance unit 210, and notifies the calculated priority to the service signature unit 204.

Herein, a "difficulty" indicates a degree of difficulty of a problem. For example, in a puzzle utilizing a hash function shared by a client and a service, when the service sends the client data that is hashed with part of the data before hashed being encapsulated, the number of the encapsulated bits can be defined as the difficulty.

The time management unit 207 records a time of reception of a service request from the client terminal 100 and sends this time information to the client terminal 100 via the service reply unit 203. Moreover, when a puzzle solution reply is received from the client terminal 100, the time management unit 207 measures the length of solution time taken by the client terminal 100 to solve the puzzle, by using the time information, and notifies the solution time to the statistic processing unit 208. Note that the time information generated by the time management unit 207 may be encrypted to prevent a malicious terminal from manipulating the time information.

The statistic processing unit 208 performs statistic processing on each service request, based on the puzzle solution time measured by the time management unit 207, and notifies the result of calculation regarding a received service request to the risk avoidance unit 210.

The liability formation unit 209 calculates the liability of the client terminal 100 that is the source of a received service request and sends the calculated liability to the risk avoidance unit 210, in response to a liability request from the risk avoidance unit 210. The liability is calculated based on information about the length of time for which the client terminal 100 used the external service device 200 in the past, by checking the timecard sent from the time management unit 105 of the client terminal 100 via the service request unit 103.

Herein, a "liability" is an index indicating a degree of likelihood that a client terminal is a legitimate client. For example, a client that has a track record of connecting to a service for a certain length of time or more can be assigned a higher priority for signature processing. Alternatively, a connection to such a client can be established at a higher priority by omitting sending a puzzle.

The risk avoidance unit 210 calculates the risk, which indicates a degree of risk that a service request received from the client terminal 100 is a DoS (Denial of Service) attack, based on the difficulty of a puzzle notified by the puzzle management unit 205 via the service reply unit 203, on the puzzle solution time notified by the time management unit 207, on the result of calculation of the statistics on service requests, notified by the statistic processing unit 208, and on the liability of the client terminal 100 notified by the liability formation unit 209, and then notifies the result of this calculation to the priority control unit 206 via the service reply unit 203.

Herein, a "risk" is an index indicating a degree of likelihood that a service request received from a client is a DoS (Denial of Service) attack. For example, a message replied to a puzzle in a short time, as well as a message replied to a low-difficulty puzzle, can be regarded as having a high risk.

In addition, the client terminal 100 according to this embodiment can be configured such that the client terminal 100 has a processing controller (CPU) and the CPU contains as modules the above-described central processing unit 101, service request unit 103, puzzle solution unit 104, time management unit 105, request retardation unit 106, and the like. These modules can be implemented by executing a program dedicated to using a predetermined program language on a general purpose computer such as a personal computer.

Further, although not shown in the drawings, the client terminal 100 may include a program hold unit for storing a program to cause the CPU to execute the service request processing, puzzle solution processing, time management processing, request retardation processing, and the like. The program hold unit is a recording medium, for example, such as a RAM, ROM, hard disk, flexible disk, compact disk, IC chip, or cassette tape. The use of such a recording medium can facilitate the storage, transportation, sale, and the like of the program.

Similarly, the external service device 200 can be configured such that the external service device 200 has a processing controller (CPU) and the CPU contains as modules the above-described central processing unit 201, service reply unit 203, service signature unit 204, puzzle management unit 205, priority control unit 206, time management unit 207, statistic processing unit 208, liability formation unit 209, risk avoidance unit 210, and the like. These modules can be implemented by executing a program dedicated to using a predetermined program language on a general purpose computer such as a personal computer.

Furthermore, although not shown in the drawings, the external service device 200 may include a program hold unit for storing a program to cause the CPU to execute the service reply processing, service signature processing, puzzle management processing, priority control processing, time management processing, statistic processing, liability formation processing, risk avoidance processing, and the like. The program hold unit is a recording medium, for example, such as a RAM, ROM, hard disk, flexible disk, compact disk, IC chip, or cassette tape. The use of such a recording medium can facilitate the storage, transportation, sale, and the like of the program.

(Service Discovery Method)

Figure 2:
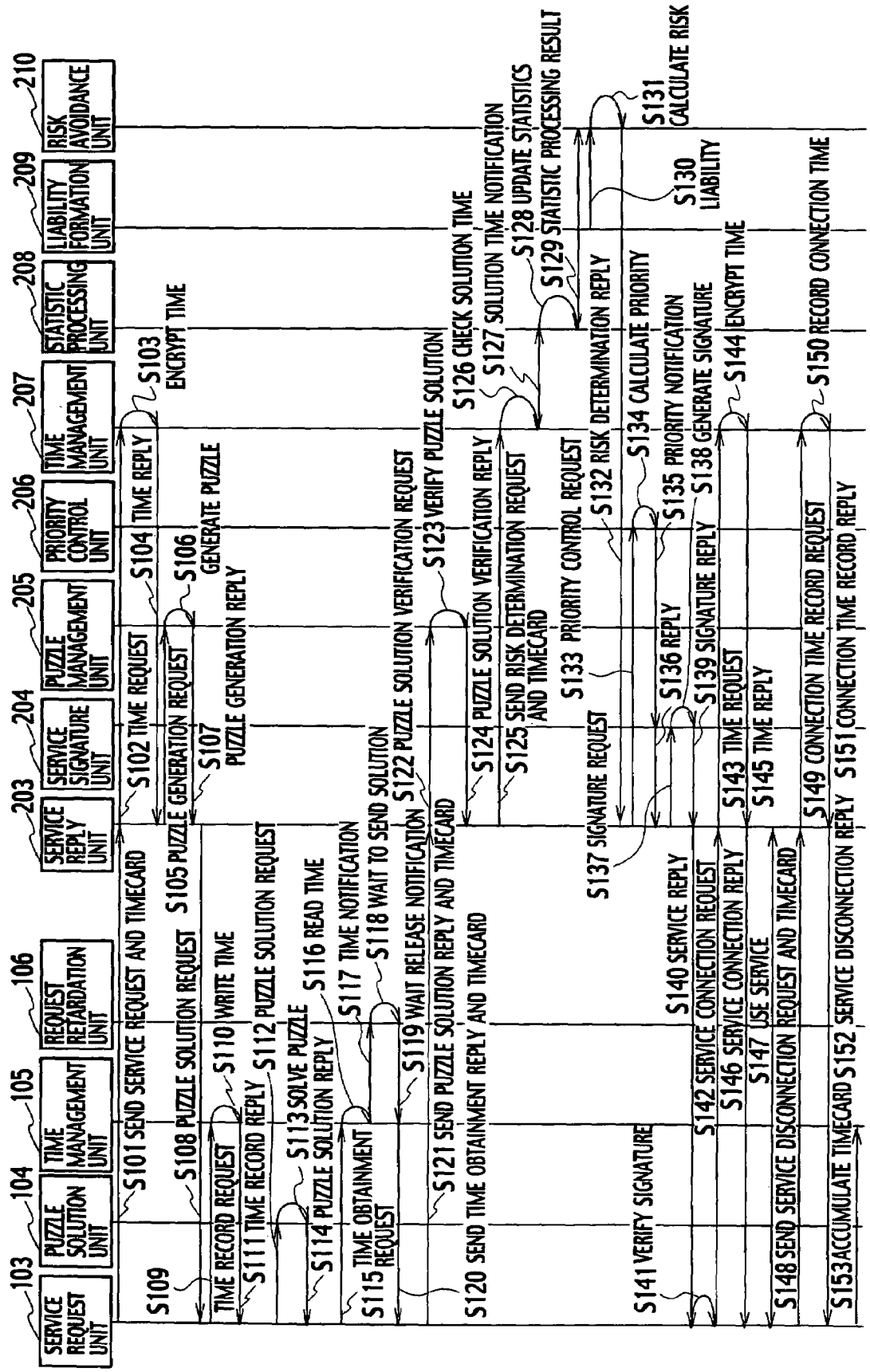
FIG. 2 is a sequence diagram of a service discovery method according to the embodiment.
Figure 3:
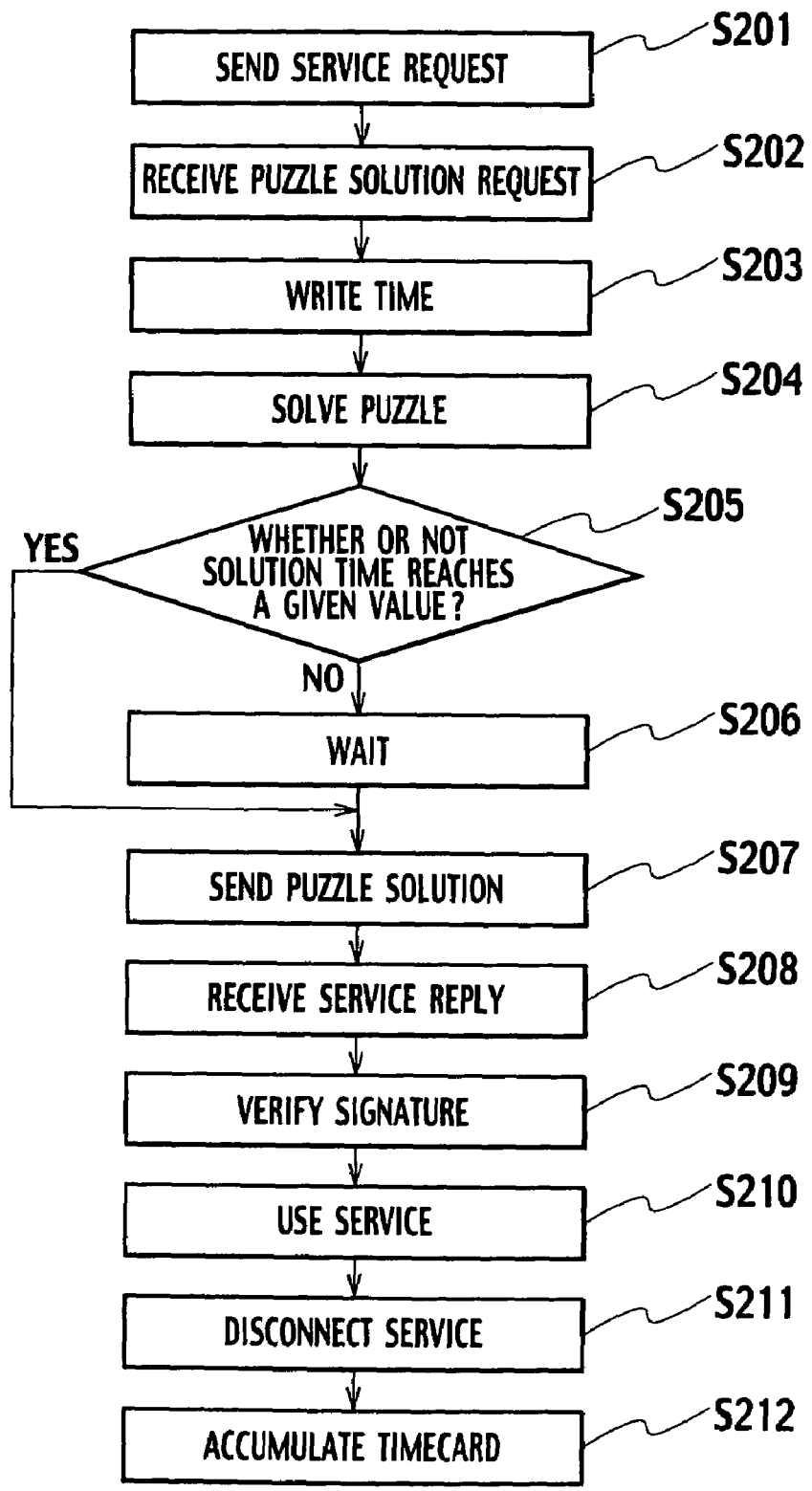
FIG. 3 is a flowchart showing operations of the client terminal according to the embodiment.
Figure 4:
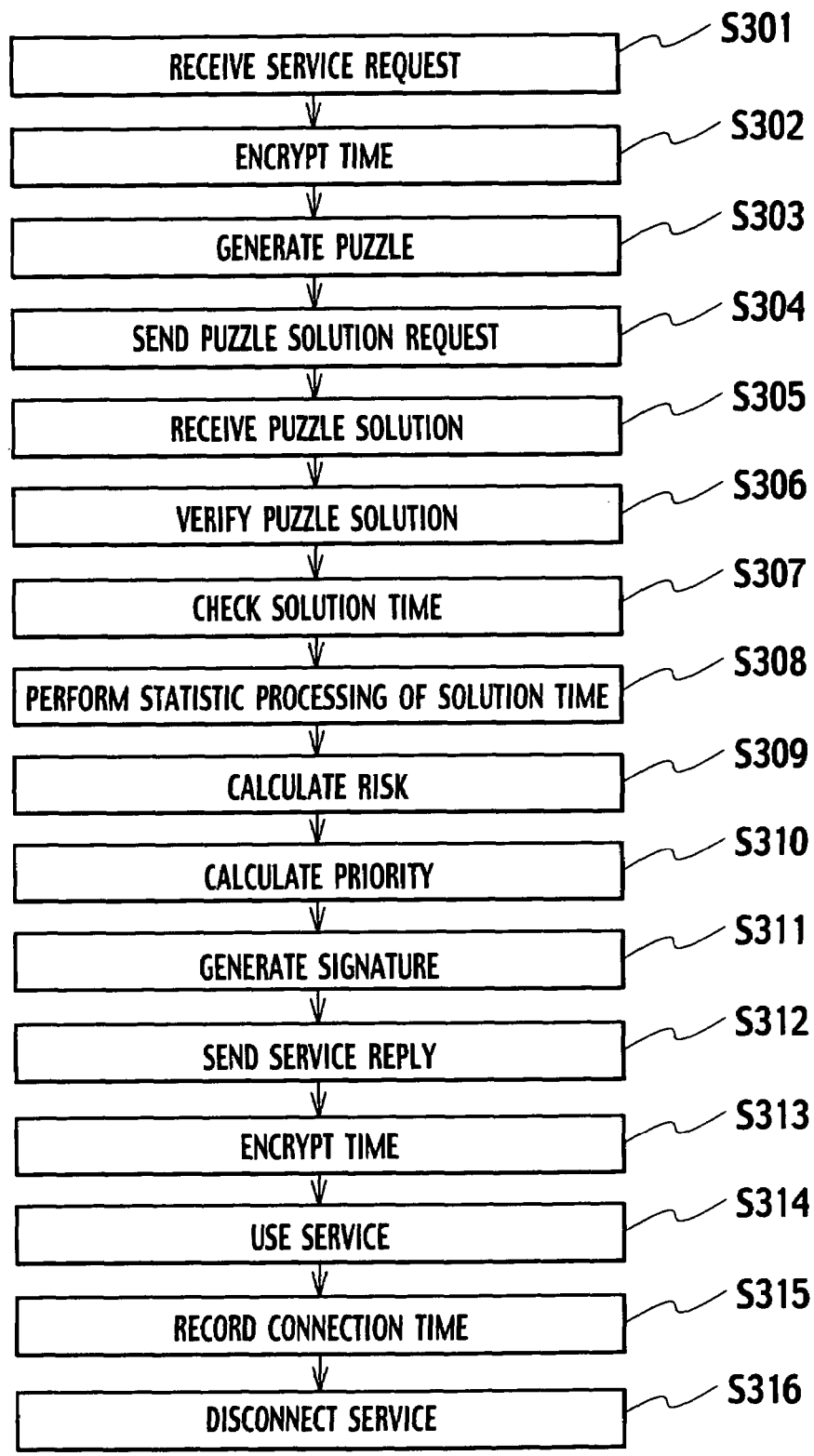
FIG. 4 is a flowchart showing operations of the external service device according to the embodiment.

Next, a service discovery method according to the embodiment will be described with reference to FIGS. 2 to 4. FIG. 2 is a sequence diagram involving the client terminal 100 and the external service device 200. FIG. 3 is a flowchart showing operations of the client terminal 100. FIG. 4 is a flowchart showing operations of the external service device 200.

A service discovery sequence includes a first step from when the client terminal 100 sends out a service request until the external service device 200 receives a solution to a puzzle, a second step from when the external service device 200 receives the solution to the puzzle until the external service device 200 sends a service reply to the client terminal 100, and a third step from when the client terminal 100 receives the service reply until the client terminal 100 receives a service disconnection reply from the external service device 200 and accumulates a timecard in the client terminal 100.

First Step

First, at step S101 in FIG. 2, the service request unit 103 of the client terminal 100 sends a service request and a timecard to the service reply unit 203 of the external service device 200 (S201 in FIG. 3).

Next, at step S102 in FIG. 2, the service reply unit 203 of the external service device 200 receives the service request (S301 in FIG. 4) and sends a time request to the time management unit 207. Subsequently, at step S103, the time management unit 207 records a time and, if necessary, encrypts the time (S302 in FIG. 4). Then, at step S104, the time management unit 207 sends a time reply to the service reply unit 203.

Next, at step S105, the service reply unit 203 sends a puzzle generation request to the puzzle management unit 205. At step S106, the puzzle management unit 205 generates a puzzle (S303 in FIG. 4). Then, at step S107, the puzzle management unit 205 sends a puzzle generation reply to the service reply unit 203.

Next, at step S108, the service reply unit 203 sends a puzzle solution request, together with the time information and the puzzle, to the service request unit 103 of the client terminal 100 (S304 in FIG. 4). The service request unit 103 receives the puzzle solution request and the others (S202 in FIG. 3).

Next, at step S109, the service request unit 103 sends a time record request to the time management unit 105, and at step S110, the time management unit 105 writes a time (S203 in FIG. 3). Additionally, apart from this time, the time management unit 105 records a time at which the puzzle started to be solved. At step Sill, the time management unit 105 sends a time record reply to the service request unit 103.

Next, at step S112, the service request unit 103 sends a puzzle solution request to the puzzle solution unit 104, and at step S113, the puzzle solution unit 104 solves the puzzle (S204 in FIG. 3). Then, at step S114, the puzzle solution unit 104 sends a puzzle solution reply to the service request unit 103.

Next, at step S115, upon obtaining the solution result, the service request unit 103 sends a time obtainment request to the time management unit 105. At step S116, the time management unit 105 reads the time stored and, at step S117, notifies the length of time taken to solve the puzzle to the request retardation unit 106.

The request retardation unit 106 determines whether or not the length of solution time reaches a given value (S205 in FIG. 3). When it does not reach the given value, then at step S118, the request retardation unit 106 waits to send the solution (S206 in FIG. 3). At step S119, the request retardation unit 106 sends a wait release notification to the time management unit 105. Moreover, at step S120, if the time management unit 105 has accumulated a timecard obtained when the client terminal 100 used the external service device 200 in the past, the time management unit 105 sends this timecard to the service request unit 103.

Next, at step S121, the service request unit 103 sends a puzzle solution reply and the timecard to the service reply unit 203 (S207 in FIG. 3).

Second Step

At step S121, the service reply unit 203 receives the puzzle solution reply and the timecard (S305 in FIG. 4). At step S122, the service reply unit 203 sends a puzzle solution verification request to the puzzle management unit 205. At step S123, the puzzle management unit 205 verifies the solution to the puzzle (S306 in FIG. 4). Then, at step S124, the puzzle management unit 205 sends a puzzle solution verification reply to the service reply unit 203.

When the solution to the puzzle is correct, then at step S125, the service reply unit 203 notifies the time information, attached to the puzzle solution reply, to the time management unit 207. At step S126, the time management unit 207 checks the length of time taken to solve the puzzle (S307 in FIG. 4).

At step S127, the time management unit 207 notifies the time taken to solve the puzzle to the statistic processing unit 208. At step S128, the statistic processing unit 208 performs statistic processing of the time taken to solve the puzzle and updates the statistics (S308 in FIG. 4).

Next, at step S129, the statistic processing unit 208 notifies the result of calculation obtained through the statistic processing to the risk avoidance unit 210. Incidentally, the risk avoidance unit 210 acquires the difficulty of the puzzle and the timecard of the client terminal 100 from the service reply unit 203. Moreover, at step S130, the risk avoidance unit 210 sends the timecard to the liability formation unit 209 and acquires information about liability. At step S131, the risk avoidance unit 210 calculates the risk, with the difficulty of the puzzle, the solution time, the result of the statistic processing, and the information about liability all considered (S309 in FIG. 4). Then, at step S132, the risk avoidance unit 210 sends the result of this calculation along with a risk determination reply to the service reply unit 203. For example, based on the puzzle solution time and difficulty, the CPU capability of a client terminal that has sent out a connection request is estimated, and client terminals that have sent out service requests are presumptively determined, whereby a client terminal that sends a number of service requests can be identified.

Next, at step S133, the service reply unit 203 sends the risk (information about risk), along with a priority control request, to the priority control unit 206. At step S134, based on the difficulty of the puzzle and the risk calculated by the risk avoidance unit 210, the priority control unit 206 calculates the priority (S310 in FIG. 4) and, at step S135, notifies the calculated priority to the service signature unit 204. At step S136, the service signature unit 204 performs priority control for signature processing on service reply messages.

At step S137, the service reply unit 203 sends a signature request to the service signature unit 204, and at step S138, the service signature unit 204 generates a signature for the highest-priority request message (S311 in FIG. 4). Then, at step S139, the service signature unit 204 sends a signature reply to the service reply unit 203, and at step S140, the service reply unit 203 sends a service reply message, with the signature added, to the service request unit 103 of the client terminal 100 (S312 in FIG. 4).

Third Step

The service request unit 103 receives the service reply (S208 in FIG. 3) and, at step S141, verifies the signature added to the received service reply (S209 in FIG. 3). When the verification of the signature is completed normally, then at step S142, the service request unit 103 sends a service connection request message to the service reply unit 203.

At step S143, the service reply unit 203 of the external service device 200 sends a time request to the time management unit 207, and at step S144, the time management unit 207 records a time and performs encryption processing (S313 in FIG. 4). Then, at step S145, the time management unit 207 sends a time reply to the service reply unit 203, and the service reply unit 203 sends a service connection reply message back to the service request unit 103.

At step S147, the use of the service is carried out (S210 in FIG. 3 and S314 in FIG. 4).

Next, at step S148, when the use of the service finishes, the service request unit 103 sends a service disconnection request and the timecard to the service reply unit 203. If the time management unit 105 has a timecard issued by the external service device 200, the service request unit 103 also sends this timecard to the service reply unit 203 at the same time.

At step S149, the service reply unit 203 sends a connection time record request to the time management unit 207, and the time management unit 207 records the length of connection time (S315 in FIG. 4). When no timecard has been sent, the time management unit 207 issues a new timecard and records the connection time. Then, at step S151, the time management unit 207 sends a connection time record reply to the service reply unit 203.

At step S152, the service reply unit 203 adds the timecard to a service disconnection reply message and sends it to the service request unit 103 (S316 in FIG. 4 and S211 in FIG. 3). At step S153, the service request unit 103 accumulates the timecard in the time management unit 105 (S212 in FIG. 3).

In the above sequence, when the external service device 200 receives a service request message, the priority control for the signature processing is performed based on the risk (information about risk) calculated by the risk avoidance unit 210. Therefore, by assigning a lower priority to the processing for a service request message from a malicious terminal, it is possible to process a service request from a legitimate client terminal at a high priority.

(Operations and Effects)

According to the client terminal 100 and the external service device 200 of this embodiment, the client terminal 100 is required to solve a puzzle when making a connection request to the external service device 200. This hampers a malicious client terminal from sending out a large number of requests, thus making it possible for a connection request from a legitimate client terminal to be processed. Therefore, even if a malicious client terminal sent an enormous number of service requests, a legitimate client terminal can discover a service as short a time as normal and connect thereto.

Moreover, the client terminal 100 includes the time management unit 105, and the external service device 200 includes the time management unit 207, whereby it is possible to manage the solution time. Further, it is possible to calculate the risk and the like based on the solution time.

Furthermore, the client terminal 100 includes the request retardation unit 106, whereby the client terminal 100 is allowed to wait to send a solution until a predetermined period of time expires, when the problem solution time is short. Therefore, since the risk of a service request to be evaluated by the external service device 200 can be made lower, it is possible to further enhance the probability that a legitimate client terminal can connect to the external service device.

The external service device 200 includes the priority control unit 206. Therefore, the service signature unit 204 can add signatures in order according to the priority. In this way, the priority control for service signature processing is performed in accordance with the difficulty of a problem solved by the client terminal 100. Accordingly, a malicious client terminal cannot make a DoS attack unless it solves a number of high-difficulty problems, which makes it possible for a service request from a legitimate client terminal to be processed.

Moreover, the external service device 200 includes the statistic processing unit 208. Therefore, it is possible to calculate the risk and the like based on the result of statistic processing.

Further, the external service device 200 includes the risk avoidance unit 210. Therefore, it is possible to calculate the risk, to calculate the priority based on the risk, and to determine the signing order in accordance with the priority. Accordingly, it is possible to estimate the risk of a DoS attack based on the information such as the difficulty of a puzzle, the solution time, and the degree of concentration of the solution time, and thus to perform priority control for the signature processing based on the risk. Hence, it is possible to process a service request from a legitimate client terminal at a high priority.

Furthermore, the external service device 200 includes the liability formation unit 209. Therefore, the liability can be used in the risk calculation by the risk avoidance unit 210. Accordingly, it is possible to more precisely perform priority control for the signature processing, to assign a higher processing priority to a service request from a client terminal that has a track record of properly using the service, and thus to process a service request from a legitimate client terminal at a high priority.

OTHER EMBODIMENTS

Although the present invention has been described using the above embodiment, it should be understood that the present invention is not limited to the description and drawings that are part of the present disclosure. Various alternative examples, embodiments, and operational techniques will become apparent to those skilled in the art from the present disclosure.

For example, in the embodiment of the present invention, a puzzle is taken as an example of the problem that imposes a load on the client terminal 100, for description. However, the problem is not limited to a puzzle but may be anything that would enforce some processing load on the client terminal 100.

Moreover, it is described in the embodiment of the present invention that the external service device 200 may include, in a single processing controller (CPU), the central processing unit 201, service reply unit 203, service signature unit 204, puzzle management unit 205, priority control unit 206, time management unit 207, statistic processing unit 208, liability formation unit 209, risk avoidance unit 210, and the like. However, these units may be separated to be included in two or more CPUs. In this case, the CPUs are to be connected through a bus or the like so that data can be exchanged between the CPUs. The same applies to the client terminal 100.

Various modifications will become possible for those skilled in the art after receiving the teachings of the present disclosure without departing from the scope thereof.

What is claimed is:

1. A service discovery system including a client terminal and a service providing device which provides data or a function to the client terminal, comprising:
   a client terminal including a processor programmed to implement
      a service request unit which generates a service requesting message requesting a service of the service providing device,
      a communication unit which sends the service requesting message generated by the service request unit to the service providing device and which receives, from the service providing device, a problem imposing a load on the client terminal,
      a solution unit which solves the problem; and
   the service providing device including a processor programmed to implement
      a problem management unit which generates the problem, when the service requesting message is received from the client terminal,
      a priority control unit which calculates a priority in accordance with a difficulty of the problem, when the solution to the problem is received from the client terminal,
      a service reply unit which generates a reply message replying to the service requesting message sent from the client terminal in accordance with an order corresponding to the calculated priority.

2. The service discovery system according to claim 1, wherein the priority calculated by the priority control unit increases as the difficulty of the problem increases.

3. The service discovery system according to claim 1, the service providing device further comprising:
   a time management unit which measures a length of solution time taken by the client terminal to solve the problem, wherein the priority control unit calculates the priority based on the length of the solution time in addition to the difficulty of the problem.

4. The service discovery system according to claim 3, wherein the priority calculated by the priority control unit increases as the length of the solution time increases.

5. The service discovery system according to claim 1, the service providing device further comprising:
   a signature unit which adds a digital signature to the message generated by the service reply unit, wherein the signature unit adds signatures in order according to the priority.

6. A client terminal which is provided with data or a function from a service providing device, the client terminal comprising:
   a processor programmed to implement
      a service request unit which generates a service requesting message requesting a service of the service providing device;
      a communication unit which sends the service requesting message generated by the service request unit to the service providing device and which receives from the service providing device a problem imposing a load on the client terminal;
      a solution unit which solves the problem;
      a time management unit which records a time of reception of the problem from the service providing device and which, when a solution to the problem is sent out, attaches thereto the time of reception of the problem; and
      a request retardation unit which, when a length of time from the time of reception of the problem until the solution to the problem is obtained does not reach a predetermined value, waits to send the solution to the service providing device.

7. A service providing device which provides data or a function to a client terminal, the service providing device comprising:
   a processor programmed to implement
      a communication unit which receives a service requesting message requesting a service from the client terminal, which sends a problem imposing a load on the client terminal to the client terminal, and which receives a solution to the problem from the client terminal;
      a problem management unit which generates the problem, when the service requesting message is received from the client terminal,
      a priority control unit which calculates a priority in accordance with a difficulty of the problem, when the solution to the problem is received from the client terminal;
      a service reply unit which generates a reply message replying to the service requesting message sent from the client terminal in accordance with an order corresponding to the calculated priority.

8. The service providing device according to claim 7, further comprising a signature unit which adds a digital signature to the reply message generated by the service reply unit, wherein the signature unit adds signatures in order according to the priority.

9. The service providing device according to claim 7, further comprising:
   a time management unit which measures a length of solution time taken by the client terminal to solve the problem;
   a statistical processing unit which performs statistic statistical processing on each service requesting message requesting the service, based on the solution time measured by the time management unit; and
   a risk avoidance unit which calculates a risk of the service requesting message, based on a statistical result obtained from the statistical processing unit.

10. The service providing device according to claim 9, further comprising a liability formation unit which determines a liability, based on a length of time for which the client terminal used the service providing device,
   wherein the risk avoidance unit calculates the risk, based on the statistical result obtained from the statistical processing unit and the liability.

11. A method of discovering a service in a system including a client terminal and a service providing device which provides data or a function to the client terminal, the method comprising:

generating, at a processor of the client terminal, a service requesting message requesting a service of the service providing device;

generating, at a processor of the service providing device, a problem imposing a load on the client terminal, when the service requesting message is received from the client terminal;

sending, at the processor of the service providing device, the problem to the client terminal;

solving, at the processor of the client terminal, the problem;

sending, at the processor of the client terminal, a solution to the problem to the service providing device;

verifying, at the processor of the service providing device, the solution to the problem when the solution is received from the client terminal;

generating, at the processor of the service providing device, a reply message replying to the service requesting message sent from the client terminal upon the verification of the solution to the problem;

wherein, in the sending of the solution to the problem, the processor of the client terminal waits to send the solution to the service providing device when a length of time from a time of reception of the problem until the solution to the problem is obtained does not reach a given value.

12. The service discovery method according to claim 11, further comprising:

by the service providing device, measuring, at the processor of the service providing device, a length of solution time taken by the client terminal to solve the problem;

performing, at the processor of the service providing device, statistical processing on each service requesting message requesting the service, based on the solution time measured;

determining, at the processor of the service providing device, a liability, based on a length of time for which the client terminal used the service providing device;

calculating, at the processor of the service providing device, a risk of the service requesting message, based on a result of the statistical processing and the liability;

calculating, at the processor of the service providing device, a priority, based on a difficulty of the problem and the risk, and adding, at the processor of the service providing device, the digital signature to the reply message in order according to the priority.

13. A method of discovering a service in a system including a client terminal and a service providing device which provides data or a function to the client terminal, the method comprising:

generating, at a processor of the client terminal, a service requesting message requesting a service of the service providing device;

generating, at a processor of the service providing device, a problem imposing a load on the client terminal, when the service requesting message is received from the client terminal;

sending, at the processor of the service providing device the problem to the client terminal;

solving, at the processor of the client terminal, the problem;

calculating, at the processor of the service providing device, a priority in accordance with a difficulty of the problem, when the solution to the problem is received from the client terminal;

generating, at the processor of the service providing device, reply message replying to the service requesting message sent from the client terminal in accordance with an order corresponding to the calculated priority.

* * * * *